(12) United States Patent
Kimura

(10) Patent No.: US 11,447,019 B2
(45) Date of Patent: Sep. 20, 2022

(54) VEHICLE CONTROL DEVICE

(71) Applicant: TOYOTA JIDOSHA KABUSHIKI KAISHA, Toyota (JP)

(72) Inventor: Masaru Kimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 17/022,750

(22) Filed: Sep. 16, 2020

(65) Prior Publication Data

US 2021/0170882 A1 Jun. 10, 2021

(30) Foreign Application Priority Data

Dec. 6, 2019 (JP) .............................. JP2019-220975

(51) Int. Cl.
*H02J 7/00* (2006.01)
*B60L 15/20* (2006.01)
*B60L 58/12* (2019.01)
*B60L 50/60* (2019.01)
*B60L 3/04* (2006.01)
*B60L 58/14* (2019.01)
*H02J 9/00* (2006.01)

(52) U.S. Cl.
CPC ................. *B60L 15/20* (2013.01); *B60L 3/04* (2013.01); *B60L 50/60* (2019.02); *B60L 58/12* (2019.02); *B60L 58/14* (2019.02); *H02J 7/0029* (2013.01); *H02J 9/002* (2013.01)

(58) Field of Classification Search
CPC .. B60L 15/20; B60L 3/04; B60L 50/60; B60L 58/12; B60L 58/14; H02J 7/0029; H02J 9/002

USPC ............................................ 320/109; 701/22
See application file for complete search history.

(56) References Cited

U.S. PATENT DOCUMENTS

| | | | |
|---|---|---|---|
| 2014/0358352 A1 | 12/2014 | Yamamoto et al. | |
| 2015/0021985 A1* | 1/2015 | Matsuda | B60L 58/15 307/10.1 |
| 2020/0108731 A1* | 4/2020 | Matsumoto | B60L 58/20 |
| 2020/0307382 A1* | 10/2020 | Moriya | B60L 53/18 |
| 2020/0307411 A1* | 10/2020 | Moriya | B60L 1/00 |

FOREIGN PATENT DOCUMENTS

JP      2013-158174 A     8/2013

OTHER PUBLICATIONS

U.S. Appl. No. 17/016,041, filed Sep. 9, 2020.

\* cited by examiner

*Primary Examiner* — Zixuan Zhou
(74) *Attorney, Agent, or Firm* — Oliff PLC

(57) ABSTRACT

A vehicle control device includes a power storage device, a drive device, a system main relay attached to a power line, and a charge circuit connected to the power line on a side of the drive device from the system main relay. The vehicle control device turns off the system main relay in a power shortage of the power storage device, and store a power shortage state of the power storage device to prohibit reactivation of the system. The vehicle control device, when charging of the power storage device using the charge circuit is requested, determines whether the power shortage state of the power storage device is stored, and when the power shortage state of the power storage device is stored, releases prohibition of system reactivation when an output limit of the power storage device reaches predetermined electric power or more due to charging.

1 Claim, 2 Drawing Sheets

VEHICLE CONTROL DEVICE

CROSS-REFERENCE TO RELATED APPLICATION

This application claims priority to Japanese Patent Application No. 2019-220975 filed on Dec. 6, 2019, incorporated herein by reference in its entirety.

BACKGROUND

1. Technical Field

The disclosure relates to a vehicle control device.

2. Description of Related Art

In the related art, as such a kind of a vehicle control device, a control device that allows a system main relay attached to a power line between a storage battery and an inverter for driving a motor to be turned off in a power shortage of the storage battery has been proposed (for example, see Japanese Unexamined Patent Application Publication No. 2013-158174 (JP 2013-158174 A)). Further, the control device determines whether the state is immediately before the power shortage, and in a case where the determination is made that the state is immediately before the power shortage, the control device controls a motor such that a vehicle speed is limited to equal to or lower than a vehicle speed interceptable the system main relay.

SUMMARY

However, in the device that turns on the system main relay in a power shortage as the vehicle control device described above, in a case where the system reactivation is requested, many devices turn off the system main relay, and then determines whether the storage battery is in a power shortage. Since precharging is performed to turn on the system main relay, even in a case of a power shortage, discharge occurs due to precharging.

The main object of a vehicle control device of an aspect of the disclosure is to suppress discharge of a power storage device in a power shortage.

The vehicle control device of an aspect of the disclosure employs the following means to achieve the main object described above.

An aspect of the disclosure relates to a vehicle control device mounted on a vehicle and including a power storage device, a drive device, a system main relay, and a charge circuit. The drive device is configured to be driven by electric power from the power storage device. The system main relay is attached to a power line between the power storage device and the drive device. The charge circuit is connected to the power line on a side of the drive device from the system main relay. The vehicle control device is configured to turn off the system main relay in a power shortage of the power storage device, and store a power shortage state of the power storage device to prohibit reactivation of the system, and configured to, in a case where charging of the power storage device using the charge circuit is requested, determine whether the power shortage state of the power storage device is stored, and in a case where the determination is made that the power shortage state of the power storage device is stored, release prohibition of system reactivation when an output limit of the power storage device reaches predetermined electric power or more due to charging.

The vehicle control device according to the aspect turns off the system main relay in a power shortage of the power storage device, and stores the power shortage state of the power storage device to prohibit reactivation of the system. In a case where charging of the power storage device using the charge circuit is requested, the vehicle control device determines whether the power shortage state of the power storage device is stored, and in a case where the determination is made that the power shortage state of the power storage device is stored, releases prohibition of system reactivation when an output limit of the power storage device reaches predetermined electric power or more due to charging. Whether the state is in a power shortage can be determined made based on whether the power shortage state is stored. Therefore, in a case where the system reactivation is prohibited due to a power shortage, the system main relay is not requested to be turned on for determining whether the state is in a power shortage in order to determine the prohibition. Accordingly, precharging can be suppressed when the system main relay is turned on to determine whether the state is in a power shortage. As a result, discharge of the power storage device in a power shortage can be suppressed.

Whether the state is in a power shortage can be determined in a case where a power storage ratio of the power storage device is equal to or lower than a predetermined ratio (for example, 15%, 20%, or 25%), or in addition to the case, in a case where an output limit of the power storage device is equal to or lower than a predetermined threshold value as not suitable to travel. Electric power that allows traveling in a short time (for example, 5 kW or 10 kW) can be used as predetermined electric power for releasing the prohibition of the system reactivation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment for implementing the disclosure will be described.

Figure 1:
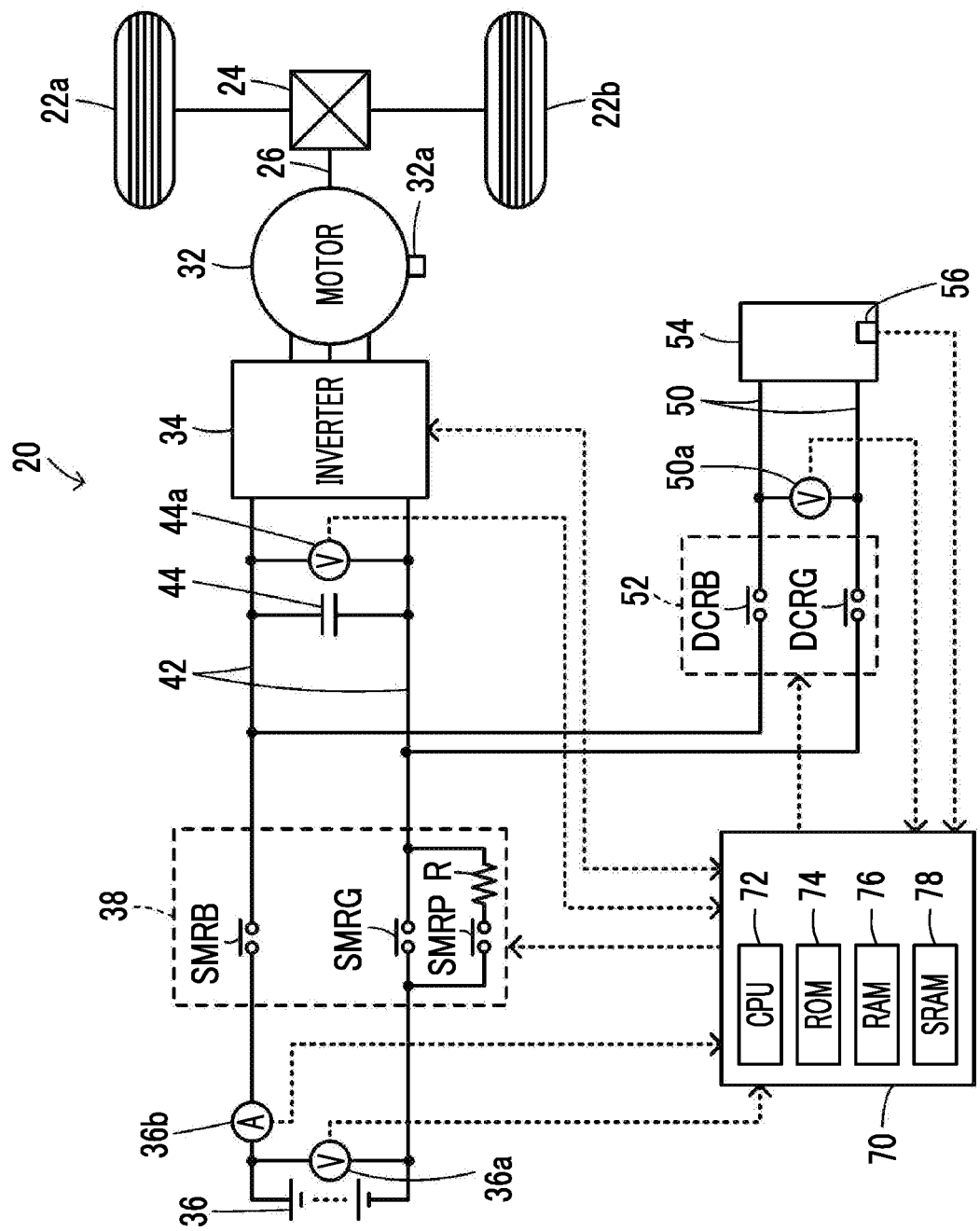
FIG. 1 is a configuration diagram showing an outline of a configuration of an electric vehicle 20 mounted with a vehicle control device 70 as an embodiment of the present disclosure.

FIG. 1 is a configuration diagram showing an outline of a configuration of an electric vehicle 20 mounted with a vehicle control device 70 as an embodiment of the present disclosure. The electric vehicle 20 of the embodiment includes, as shown in FIG. 1, a motor 32, an inverter 34, a battery 36, a power line 42, a system main relay 38, a charging power line 50, a vehicle-side inlet 54, and the vehicle control device 70.

The motor 32 is configured as a synchronous generator motor, and includes a rotor embedded with a permanent magnet and a stator around which a three-phase coil is wound. The rotor of the motor 32 is connected to a drive shaft 26 coupled to drive wheels 22a, 22b via a differential gear 24.

The inverter 34 is connected to the motor 32 and is connected to the power line 42. The inverter 34 is configured as a well-known inverter circuit including six transistors and six diodes.

The battery 36 is configured as, for example, a lithium-ion secondary battery or a nickel-hydrogen secondary battery, and is connected to the power line 42 via the system main relay 38. A capacitor 44 is connected to a positive electrode bus and a negative electrode bus of the power line 42.

The system main relay 38 includes a positive electrode side relay SMRB that is provided in the positive electrode bus of the power line 42, a negative electrode side relay SMRG that is provided in the negative electrode bus of the power line 42, and a precharge circuit in which a precharging resistor R and a precharging relay SMRP are connected in series so as to bypass the negative electrode side relay SMRG.

The charging power line 50 has a first end that is connected to the power line 42 on the inverter 34 side (the motor 32 side) from the system main relay 38, and a second end that is connected to the vehicle-side inlet 54. A charging relay 52 is attached to the charging power line 50. The charging relay 52 includes a positive electrode side relay DCRB that is provided in a positive electrode side line of the charging power line 50 and a negative electrode side relay DCRG that is provided in a negative electrode side line of the charging power line 50. The charging power line 50 is connected to an external charging power line from an external direct current power supply (not shown) by connecting an external connector of the external direct current power supply to the vehicle-side inlet 54, and electric power from an external commercial power source is converted to direct current power by the external direct current power supply and is supplied from the external charging power line 150. The vehicle-side inlet 54 is provided with a connection switch 56 that determines whether the external connector is connected.

The vehicle control device 70 is configured as a microprocessor centered on a CPU 72, and includes a ROM 74 that stores processing programs or a RAM 76 that temporarily stores data, an SRAM 78 that temporarily holds data, an input/output port (not shown), and a communication port (not shown), in addition to the CPU 72.

The vehicle control device 70 receives signals from various sensors are input to via the input port. Examples of signals input to the vehicle control device 70 include a rotational position θm from a rotational position detection sensor (for example, a resolver) 32a that detects the rotational position of the rotor of the motor 32, a voltage VB from a voltage sensor 36a attached between terminals of the battery 36, and a current IB from a current sensor 36b attached to an output terminal of the battery 36. A voltage VH of the capacitor 44 (the power line 42) from a voltage sensor 44a attached between terminals of the capacitors 44 can also be exemplified. A charging voltage Vchg from a voltage sensor 50a attached to the charging power line 50 or connection signals from the connection switch 56 provided in the vehicle-side inlet 54 is also input. Since the vehicle control device 70 also functions as a driving control device of the vehicle, information needed to control traveling is also input. Examples of the information items include, although not shown, an ignition signal from an ignition switch, a shift position from a shift position sensor that detects an operation position of a shift lever, an accelerator operation amount from an accelerator pedal position sensor that detects a stepping amount of an accelerator pedal, a brake pedal position from a brake pedal position sensor that detects a stepping amount of a brake pedal, and a vehicle speed from a vehicle speed sensor.

The vehicle control device 70 outputs various control signals via the output port. Examples of the signals output from the vehicle control device 70 include, for example, a switching control signal to the transistor of the inverter 34, a driving control signal to the system main relay 38, or a driving control signal to the charging relay 52.

Figure 2:
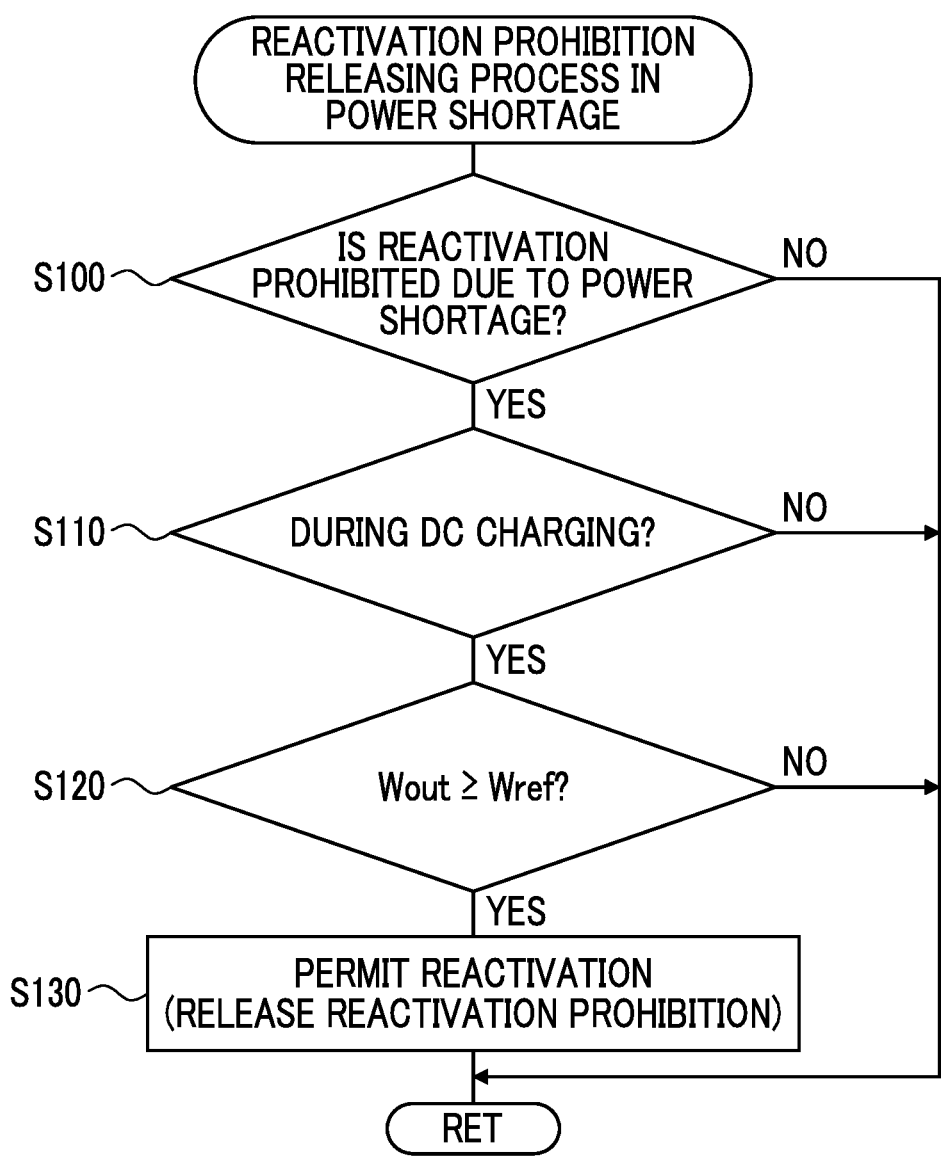
FIG. 2 is a flowchart showing an example of a reactivation prohibition releasing process in a power shortage executed by the vehicle control device 70.

Hereinafter, operations of the electric vehicle 20 of the embodiment configured as above, in particular, operations of the battery 36 in a power shortage will be described. In a case where the battery 36 is determined to be in a power shortage, the vehicle control device 70 of the embodiment turns off (intercepts) the system main relay 38, stores that the battery 36 is in the power shortage state in a predetermined area of the SRAM 78, and prohibits the system reactivation. Whether the state is in a power shortage can be determined in a case where a power storage ratio SOC of the battery 36 is equal to or lower than a predetermined ratio (for example, 15%, 20%, or 25%), or in addition to the case, in a case where an output limit Wout as a maximum allowable power that may be output from the battery 36 is equal to or lower than a predetermined threshold value (for example, 4 kW or 3 kW) as not suitable to travel. In a case where the charge request is performed in the power shortage stage, the vehicle control device 70 of the embodiment repeatedly executes a reactivation prohibition releasing process in a power shortage shown in FIG. 2 until prohibition of the system reactivation is released. The charge request is performed in a case where the connection switch 56 detects that the external connector is connected to the vehicle-side inlet 54.

When the reactivation prohibition releasing process in a power shortage is executed, the CPU 72 of the vehicle control device 70 determines whether system reactivation is prohibited due to a power shortage (step S100). The determination can be made based on whether the power shortage state of the battery 36 is stored in a predetermined area of the SRAM 78. That is, the CPU 72 determines that the system reactivation is prohibited due to a power shortage in a case where the power shortage state of the battery 36 is stored in a predetermined area of the SRAM 78, and determines that the system reactivation is not prohibited due to a power shortage in a case where the power shortage state of the battery 36 is not stored in a predetermined area of the SRAM 78. In a case where the determination is made that the system reactivation is not prohibited due to a power shortage, the process ends. Since system reactivation is not prohibited, the release of the prohibition of the system reactivation is not needed.

In a case where the determination is made that the system reactivation is prohibited due to a power shortage in step S100, the CPU 72 determines whether the battery is being charged by direct current power (DC charge) (step S110). The determination can be made based on the current IB detected by the current sensor 36b. In a case where the determination made that the battery is not being charged by the direct current power (DC charge), the battery is determined to not be charged yet, and the process ends.

In a case where the determination is made that the battery is being charged by the direct current power (DC charge) in step S110, the CPU 72 determines the output limit Wout of the battery 36 reaches a threshold value Wref or more (step S120). The threshold value Wref is predetermined as output power that allows traveling in a short time, and for example, 5 kW or 10 Kw can be used. In a case where the determination is made that the output limit Wout of the battery 36 does not reach the threshold value Wref or more, the prohibition of the system reactivation is determined not to be released, and the process ends.

In a case where the determination is made that the output limit Wout of the battery 36 reaches the threshold value Wref or more in step S120, the CPU 72 releases the prohibition of the system reactivation (permits the system activation) (step S130), and the process ends.

Since the vehicle control device 70 of the embodiment described above determines whether the battery is in the power shortage state based on whether the power shortage state is stored in a predetermined area of the SRAM 78, the system main relay 38 is not requested to be turned on for the determination. Accordingly, precharging can be suppressed when the system main relay 38 is turned on to determine whether the state is in a power shortage. As a result, discharge of the battery 36 in a power shortage can be suppressed. Since the system reactivation is prohibited in a case where the battery 36 is in the power shortage state, the system reactivation is suppressed in the power shortage state.

In the embodiment, the electric vehicle 20 includes the charging power line 50 or the charging relay 52, and the vehicle-side inlet 54 that are for DC charging, but may additionally include a power line or a charging relay, a charger, and an inlet that are for AC charging (charging by alternating current power). In this case, the power line for AC charging may be connected to the power line 42 on the battery 36 side from the system main relay 38 or on the inverter 34 side from the system main relay 38. In a case where the power line for AC charging is connected to the power line 42 on the inverter 34 side from the system main relay 38, the reactivation prohibition releasing process in a power shortage shown in FIG. 2 need only be executed similar to the embodiment by changing "DC charging?" of step S110 to "AC charging?". In this case, the power line or charging relay, the charger, and the inlet that are for AC charging (charging by alternating current power) correspond to the "charge circuit".

The correspondence between the main elements of the embodiment and the main elements of the disclosure described in the Summary of the Disclosure section will be described. In the embodiment, the battery 36 corresponds to the "power storage device", the inverter 34 and the motor 32 correspond to the "drive device", the power line 42 corresponds to the "power line", the system main relay 38 corresponds to the "the system main relay", the charging power line 50 or the charging relay 52, and the vehicle-side inlet 54 correspond to the "charge circuit", and the vehicle control device 70 corresponds to the "vehicle control device".

The correspondence between the main elements of the embodiment and the main elements of the disclosure described in the Summary of the Disclosure section is not construed to limit elements of the disclosure described in the Summary of the Disclosure section, since the embodiment is an example to specifically describe the mode for carrying out the disclosure described in the Summary of the Disclosure section. That is, the interpretation of the disclosure described in the Summary of the Disclosure section should be made based on the description of the section, and the embodiment is only the specific example of the disclosure described in the Summary of the Disclosure section.

As described above, the aspect of implementing the disclosure has been described using the embodiment. However, the disclosure is not limited to the embodiment, and various modifications could be made without departing from the scope of the disclosure.

The present disclosure can be used in the manufacturing industry of the vehicle control device.

What is claimed is:
1. A vehicle control device comprising:
a power storage device;
a drive device configured to be driven by electric power from the power storage device;
a system main relay attached to a power line between the power storage device and the drive device; and
a charge circuit connected to the power line on a side of the drive device from the system main relay,
wherein the vehicle control device is configured to turn off the system main relay in a power shortage of the power storage device, and store a power shortage state of the power storage device to prohibit reactivation of the system, and configured to, in a case where charging of the power storage device using the charge circuit is requested, determine whether the power shortage state of the power storage device is stored, and in a case where the determination is made that the power shortage state of the power storage device is stored, release prohibition of system reactivation when an output limit of the power storage device reaches predetermined electric power or more due to charging.

* * * * *